(12) United States Patent
Berestov et al.

(10) Patent No.: US 7,782,367 B2
(45) Date of Patent: Aug. 24, 2010

(54) DIRECT CALIBRATION OF COLOR IMAGING DEVICES

(75) Inventors: Alexander Berestov, San Jose, CA (US); Ted J. Cooper, Sunnyvale, CA (US); Kenichi Nishio, Yokohama (JP); Masaya Kinoshita, Yokohama (JP); Ting Zhang, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 364 days.

(21) Appl. No.: 11/818,796

(22) Filed: Jun. 14, 2007

(65) Prior Publication Data

US 2008/0310710 A1 Dec. 18, 2008

(51) Int. Cl.
*H04N 5/228* (2006.01)
(52) U.S. Cl. .................................... 348/222.1; 348/180
(58) Field of Classification Search .................. 348/187, 348/223.1, 241–255
See application file for complete search history.

(56) References Cited

U.S. PATENT DOCUMENTS

| | | | |
|---|---|---|---|
| 5,668,596 A | 9/1997 | Vogel | 348/222 |
| 6,130,756 A | 10/2000 | Grady et al. | 358/1.1 |
| 6,184,925 B1 * | 2/2001 | Abe et al. | 348/223.1 |
| 6,734,896 B2 | 5/2004 | Nobori et al. | |
| 7,012,634 B2 * | 3/2006 | Vogel et al. | 348/187 |
| 7,235,773 B1 * | 6/2007 | Newman | 348/241 |
| 2003/0081214 A1 | 5/2003 | Mestha et al. | 356/402 |
| 2003/0233589 A1 | 12/2003 | Alvarez | |
| 2005/0275911 A1 | 12/2005 | Yamada et al. | 358/518 |
| 2006/0142965 A1 | 6/2006 | Minor | |
| 2007/0177032 A1 * | 8/2007 | Wong | 348/223.1 |
| 2008/0170228 A1 * | 7/2008 | Jiang | 348/231.99 |

FOREIGN PATENT DOCUMENTS

EP 1367815 A2 3/2003

* cited by examiner

*Primary Examiner*—Gevell Selby
(74) *Attorney, Agent, or Firm*—Haverstock & Owens LLP

(57) ABSTRACT

A system for and method of determining calibration parameters while only capturing a single image is described herein. Furthermore, traditional calibration algorithms are avoided by the direct determination of the calibration parameters. The determination of the calibration parameters is possible by first determining a training data set from images acquired of a variety of objects with a multitude of colors. Then, using the training data set, regression coefficients are generated. A camera to be calibrated then acquires only one set of image information such as a single picture. Then, using the regression coefficients and the acquired information, the calibration parameters are directly estimated for that camera.

30 Claims, 11 Drawing Sheets

DIRECT CALIBRATION OF COLOR IMAGING DEVICES

FIELD OF THE INVENTION

The present invention relates to the field of digital devices. More specifically, the present invention relates to calibrating digital devices.

BACKGROUND OF THE INVENTION

A digital still camera (DSC) or video camera (camcorder) has a sensor that is covered by a color filter array (CFA) to create pixel locations. A DSC typically uses red, green and blue (RGB) filters to create their image. Most current camcorders typically use cyan, magenta, yellow and green (CMYG) filters for the same purpose.

A conventional sensor is a charge-coupled device (CCD) or complimentary metal oxide semiconductor (CMOS). An imaging system focuses a scene onto the sensor and electrical signals are generated that correspond to the scene colors that get passed through the colored filters. Electronic circuits amplify and condition these electrical signals for each pixel location and then digitize them. Algorithms in the camera then process these digital signals and perform a number of operations needed to convert the raw digital signals into a pleasing color image that can be shown on a color display or sent to a color printer.

Each color camera has a unique sensor, CFA, and analog electronics system. The sensor and CFA have part-to-part variations. Accordingly, the electronic system needs to be calibrated for each camera. The goal is to make a "real world" scene captured with different cameras look the same when rendered on a display device. In order to calibrate an individual camera, the properties of the individual camera's primary color channels (CMYG for a camcorder; RGB for a DSC) need to be measured so that the individual camera's response to known colors can be quantized.

In the past, to calibrate a DSC, several pictures were taken with the DSC of objects with different colors. The more colors acquired, the better the calibration would be. The data from these pictures would then be transferred to a computer for analysis, and then parameters are adjusted within the DSC based on the analysis so that the DSC produces the best and most realistic colors. As described above, this was necessary because there are part to part differences in each camera such as there are slight variations in each sensor.

The main drawback of the previous systems which took multiple pictures is that they were slow. It takes time to take a number of pictures of different objects with different colors. It also takes time to transfer the data to a computer for analysis and calibration because typically the connection is slow.

SUMMARY OF THE INVENTION

A system for and method of determining calibration parameters while only capturing a single image is described herein. Furthermore, traditional calibration algorithms are avoided by the direct determination of the calibration parameters. The determination of the calibration parameters is possible by first determining a training data set from images acquired of a variety of objects with a multitude of colors. Then, using the training data set, regression coefficients are generated. A camera to be calibrated then acquires only one set of image information such as a single picture. Then, using the regression coefficients and the acquired information, the calibration parameters are directly estimated for that camera.

In one aspect, a computing device for calibrating an imaging device comprises a processor and an application for utilizing the processor to calculate a set of calibration parameters from an image and a training data set wherein the set of calibration parameters are used to calibrate the imaging device. The device further comprises a communication unit for communicating with the imaging device. The imaging device is selected from the group consisting of a digital camera and a digital camcorder. The computing device is selected from the group consisting of a personal computer, a server, a workstation, a PDA and a laptop. Preferably, the image is of more than one color. The computing device calibrates the imaging device. Specifically, the computing device calibrates a sensor within the imaging device. Regression coefficients are determined from the training data set. The set of calibration parameters are determined from the regression coefficients and information from the image. The regression coefficients are computed using a method selected from the group consisting of multiple regression, sequential regression from residues and pseudoinverse. In some embodiments, the processor and the application are contained within the imaging device.

In another aspect, a calibration system comprises an imaging device for acquiring an image and a computing device coupled to the imaging device for storing a training data set and for calculating a set of calibration parameters from the image and the training data set wherein the set of calibration parameters are used to calibrate the imaging device. The imaging device is selected from the group consisting of a digital camera and a digital camcorder. The computing device is selected from the group consisting of a personal computer, a server, a workstation, a PDA and a laptop. Preferably, the image is of more than one color. The computing device calibrates the imaging device. The computing device calibrates a sensor within the imaging device. Regression coefficients are determined from the training data set. The set of calibration parameters are determined from the regression coefficients and information from the image. The regression coefficients are computed using a method selected from the group consisting of multiple regression, sequential regression from residues and pseudoinverse.

In another aspect, a network of systems for calibrating imaging devices comprises a training system which further comprises a first set of imaging devices for acquiring a first set of imaging information and a first computing device coupled to the first set of imaging devices for computing a training data set and a calibrating system coupled to the training system through a network, wherein the calibrating system further comprises a second set of imaging devices for acquiring a second set of imaging information and a second computing device coupled to the second set of imaging devices for calibrating the second set of imaging devices. Calibrating is by direct estimation of calibration parameters. The second set of imaging information is a single image. The first set of imaging devices and the second set of imaging devices are selected from the group consisting of digital cameras and digital camcorders. The first computing device and the second computing device are selected from the group consisting of a personal computer, a server, a workstation, a PDA and a laptop. Preferably, the single image is of more than one color. Regression coefficients are determined from the training data set. The set of calibration parameters are determined from the regression coefficients and information from the single image. The regression coefficients are computed using a method selected from the group consisting of multiple regression, sequential regression from residues and pseudoinverse.

In yet another aspect, a method of calibrating an imaging device comprises acquiring an image of more than one color with the imaging device, transferring the image to a computing device, calculating a set of calibration parameters from the image and a training data set and calibrating the imaging device using the set of calibration parameters. The imaging device is selected from the group consisting of a digital camera and a digital camcorder. The computing device is selected from the group consisting of a personal computer, a server, a workstation, a PDA and a laptop. Calibrating the imaging device includes calibrating a sensor within the imaging device. The method further comprises generating the training data set. The training data set is generated from a first set of previously acquired images. Regression coefficients are determined from the training data set. The set of calibration parameters are determined from the regression coefficients and information from the image. The regression coefficients are computed using a method selected from the group consisting of multiple regression, sequential regression from residues and pseudoinverse. In some embodiments, the computing device is contained within the imaging device

DETAILED DESCRIPTION OF THE PREFERRED EMBODIMENT

Figure 1:
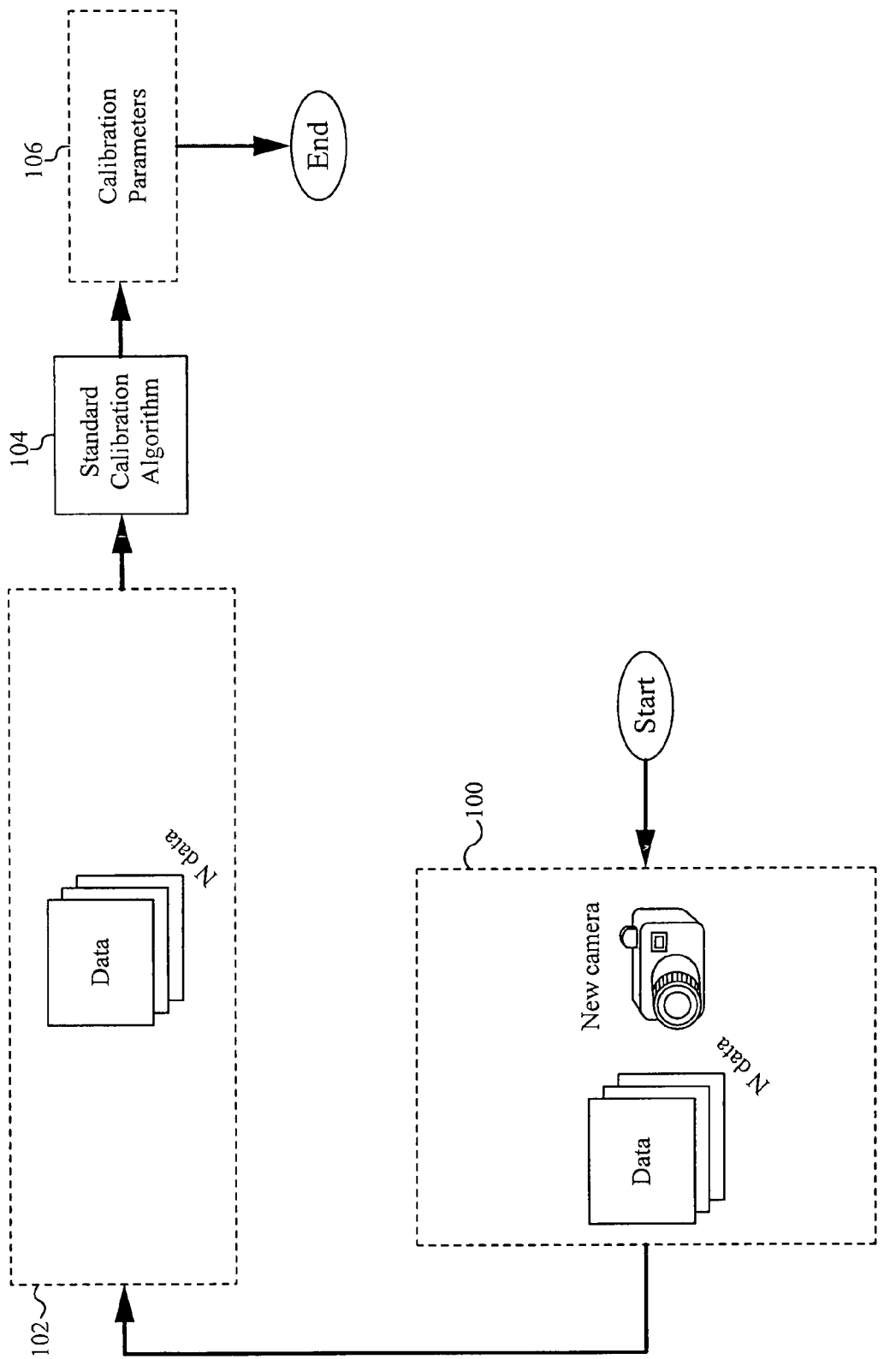
FIG. 1 illustrates a graphical flowchart of a process of standard calibration.

In order for Digital Still Cameras (DSCs) and digital camcorders to function properly, their Charge-Coupled Device (CCD) or Complementary Metal-Oxide-Semiconductor (CMOS) sensor arrays have to be calibrated so that blue is blue, red is red and so on, in an image. Using a standard method of calibration, each imaging device is shown a collection of color bars in a calibrated color box or other images that have varying colors. The raw data outputs from the imaging devices are captured. By combining the results from the measured patches, calibration parameters are able to be generated which form the basis of imaging device calibration.

The calibration parameters are very sensitive to small differences that exist between individual imaging device sensors on the factory floor. Therefore, care is needed to accurately determine the calibration parameters.

A system for and method of computing calibration parameters using a form of linear regression based on a training data set of imaging devices is described herein. The advantage of the linear regression method is that only a single exposure of the color bar patches is needed for each individual imaging device once a training data set is compiled. Only having to make a single exposure for the individual imaging devices on the factory floor saves a significant amount of time, since thousands of imaging devices are produced and calibrated every day.

The calibration of an imaging device such as a DSC or camcorder is a very critical element in the manufacture of a unit. Any color shift of standard memory colors (e.g. sky, grass, flesh tones) is instantly seen by the customer and would make the DSC or camcorder generally worthless. The primary colors from the camera CCD are taken and converted to a raw form of RGB (red, green and blue channels). A number of processing steps then take place to change the brightness of the scene (referred to as gamma processing), and then the image is converted to a new color space (YCrCb) including a brightness signal (designated by Y), and two chrominance channels (designated by Cr and Cb, respectively). The final calibration operation takes the Cr and Cb components of the image and enhances them to provide more vivid emphasis of the colors. This is done by modifying the Cr, Cb values. The resulting image is then ready to be displayed on a monitor, potentially, compressed to the same space, and then stored on some archival media.

The spectral sensitivity data out of the camera's CCD or CMOS sensor is able to either be raw CMYG or raw RGB.

To overcome the differences in the images that occur from the minor differences in the sensors, a camera processing algorithm performs sums and differences of the various raw data channels. After some normalization, what remains is a raw brightness channel (Y), and two chrominance channels (Cr and Cb, respectively). Typically, all knowledge of the original raw CCD color channels is lost at this point. All further processing only concerns the Y, Cr and Cb values, regardless of whether the original data started out as raw RGB or raw CMYG.

A camera processing algorithm transforms the Y, Cr and Cb values into a linear RGB set of values. The linear RGB values are not the same as the raw RGB values that came from the CCD. Once the linear RGB values are computed, then they are processed via the gamma curve processing for the brightness channel Y. Then, a white balancing step is performed to ensure that R=G=B=1 for a white patch. At this point, the RGB values are referred to as non-linear and white balanced.

The next step takes the non-linear and white balanced RGB and transforms them into Y', Cr' and Cb' values. The prime notation behind the variables denotes that these entities are non-linear and white balanced. The last major step is to take the Cr' and Cb' values, which represent the color in an image, and process them so that the image has more saturation and fidelity compared to real-life objects positioned beside a CRT monitor. Cr' and Cb' are transformed into Cr" and Cb", respectively. The double primes denote that the color channel has been enhanced to become more vivid.

FIG. 1 illustrates a graphical flowchart of a process of standard calibration. In the step 100, an imaging device acquires a set of information of multiple images, wherein the set of information includes different images containing varying colors. The information acquired is preferably an image of multiple colors such as color boxes with a variety of color patches. In the step 102, the set of information is transferred to a computing device. In the step 104, a standard calibration algorithm is implemented to calculate calibration parameters. In the step 106, the calibration parameters are used to calibrate the imaging device and ensure the images acquired by the imaging device are properly displayed.

Figure 2:
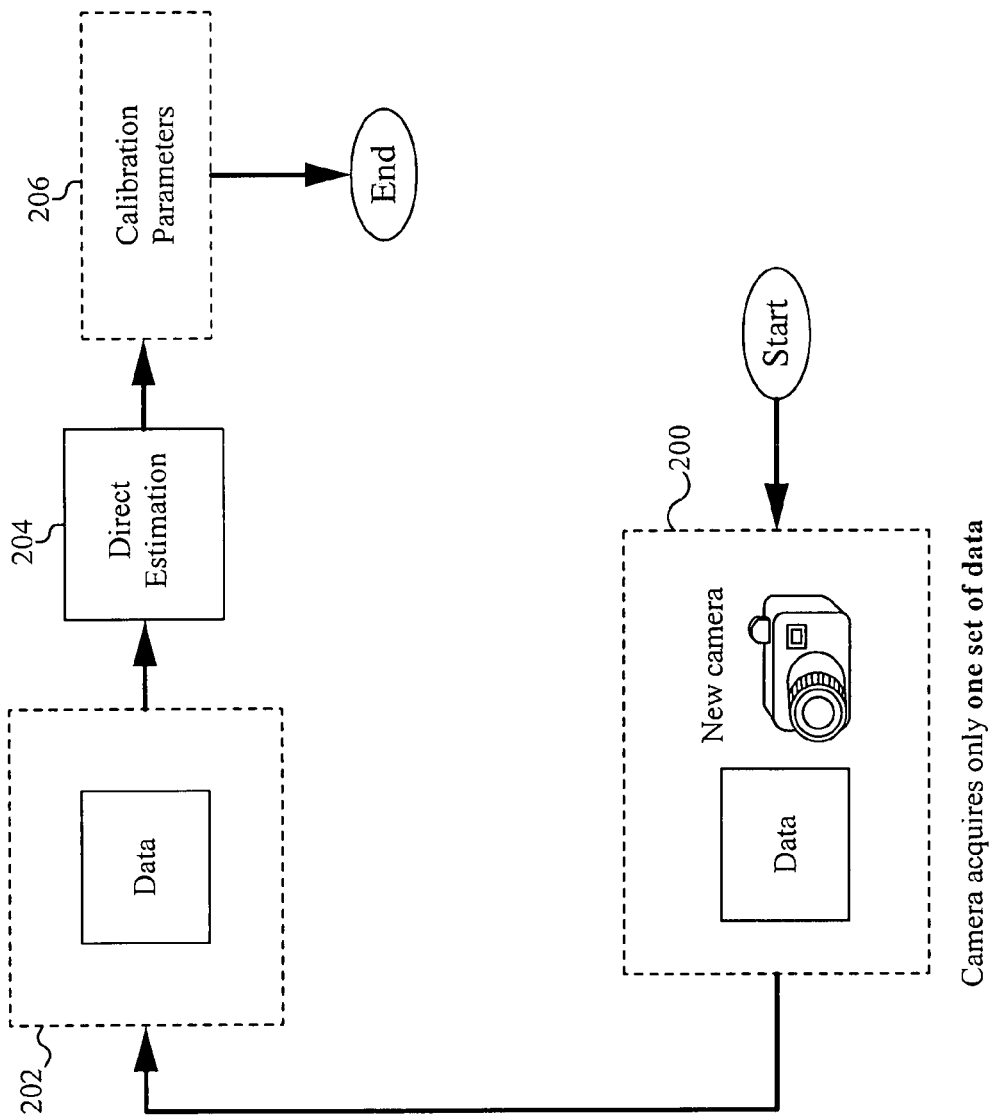
FIG. 2 illustrates a graphical flowchart of a process of calibrating an imaging device using direct estimation.

FIG. 2 illustrates a graphical flowchart of a process of calibrating an imaging device using direct estimation. In the step 200, an imaging device acquires only one set of information of a single image. Again, the information acquired is preferably an image of more than one color such as a color box. In the step 202, the set of information is transferred to a computing device. In the step 204, direct estimation is implemented to calculate calibration parameters. Direct estimation preferably utilizes matrix multiplication. Direct estimation requires the use of a training data set to determine the calibration parameters, which is described further below. In the step 206, the calibration parameters are used to calibrate the imaging device and ensure the images acquired by the imaging device are properly displayed.

Figure 3:
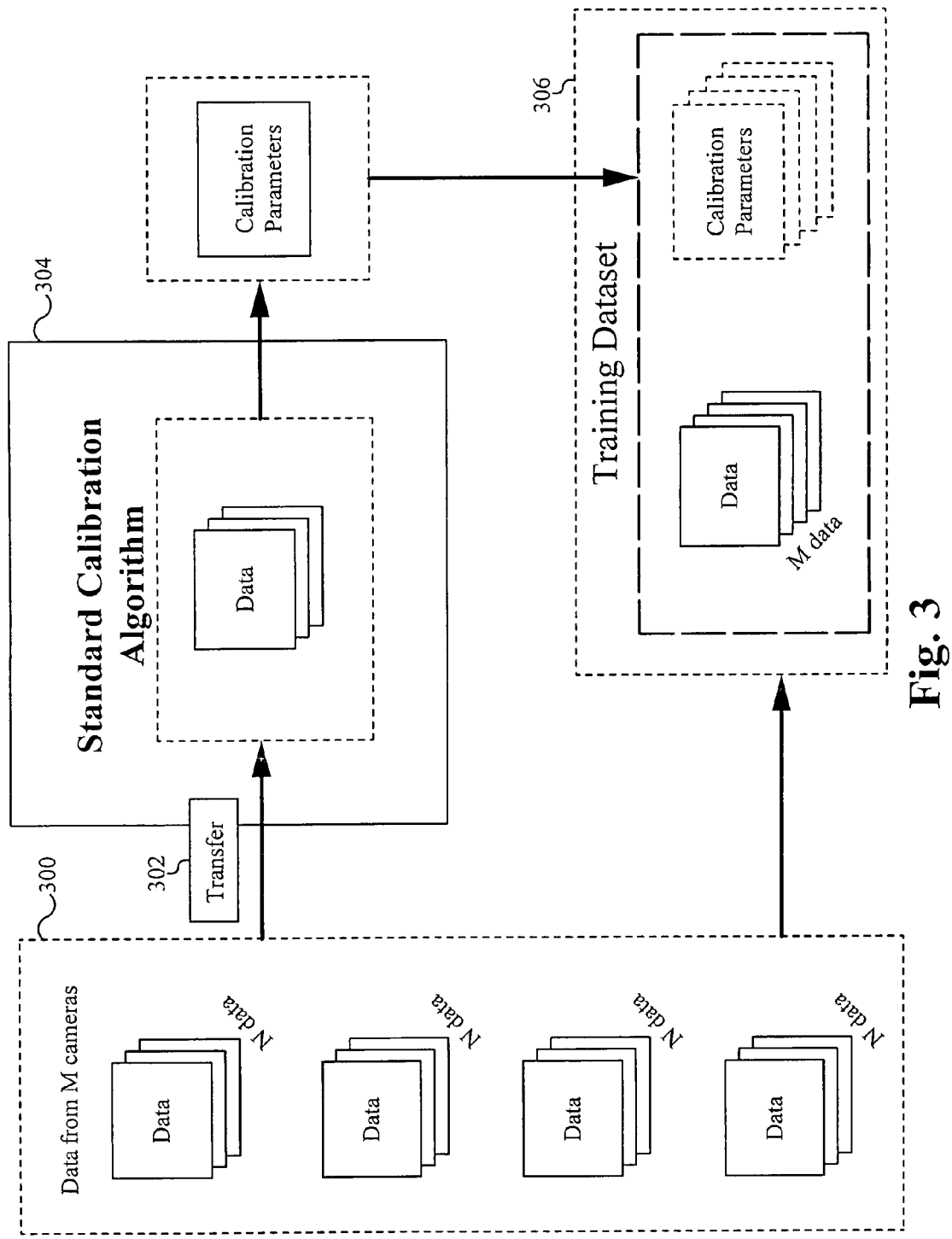
FIG. 3 illustrates a graphical flowchart of a process of generating a training data set.

FIG. 3 illustrates a graphical flowchart of a process of generating a training data set. To be able to directly estimate calibration data, the training data set is needed. In the step 300, M cameras acquire sets of information, wherein the sets of information include objects of varying colors. Again, the information acquired is preferably an image of more than one color. In the step 302, the information is transferred from each of the cameras to a computing device. In the step 304, a standard calibration algorithm is implemented to calculate calibration parameters using the computing device. Standard calibration also includes converting the information from the RGB to the YCrCb format. In the step 306, the training data set is generated, wherein the training data set comprises the information acquired transformed into the YCrCb format and the calibration parameters for each of the M cameras. The process of generating the training data set is able to be performed away from the factory floor so as not to interrupt the manufacturing process.

Figure 4:
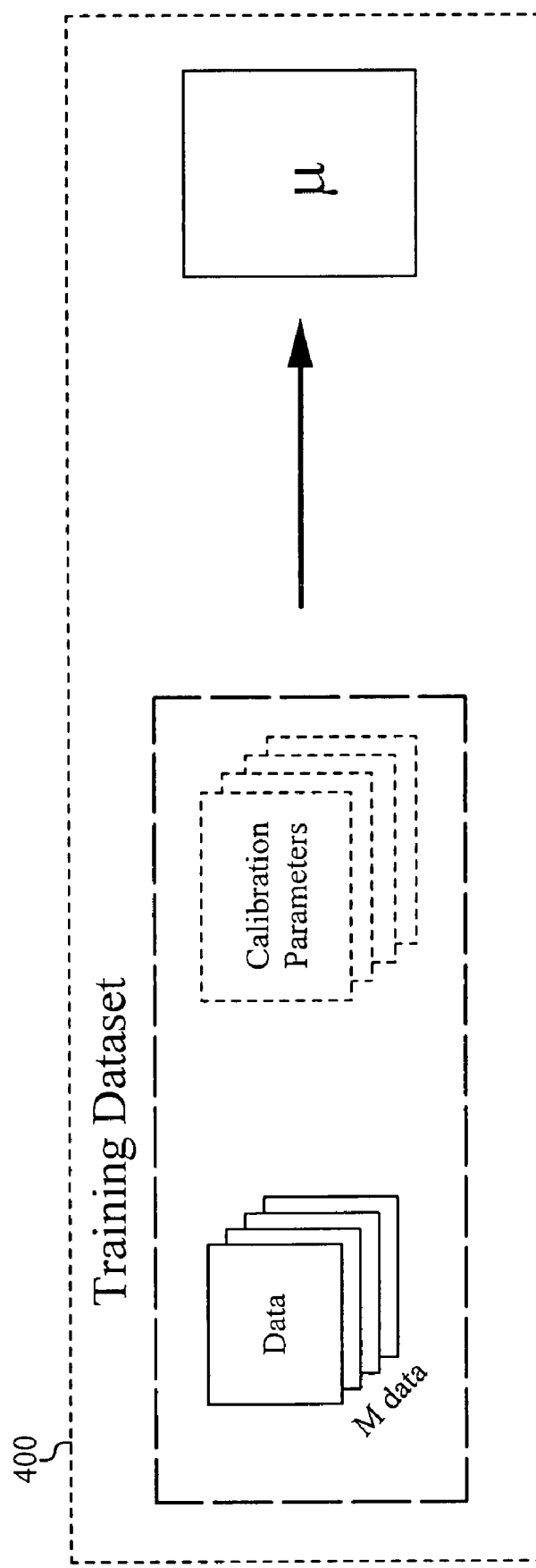
FIG. 4 illustrates a graphical flowchart of a process of generating regression coefficients.

FIG. 4 illustrates a graphical flowchart of a process of generating a set of regression coefficients. In the step 400, a training data set is used to determine the set of regression coefficients, $\mu$. Multiple regression, sequential regression from residues or pseudoinverse is applied to the training data set to determine the set of regression coefficients, $\mu$. Pseudoinverse is preferred over multiple regression. Pseudoinverse has benefits when used with a square matrix. Also, there are very fast algorithms for implementing pseudoinverse.

Sequential regression from residues is described in U.S. patent application Ser. No. 11/818,801 filed Jun. 14, 2007, entitled, "Sequential Regression for Camera Calibration from Residues," which is also incorporated by reference herein.

Figure 5:
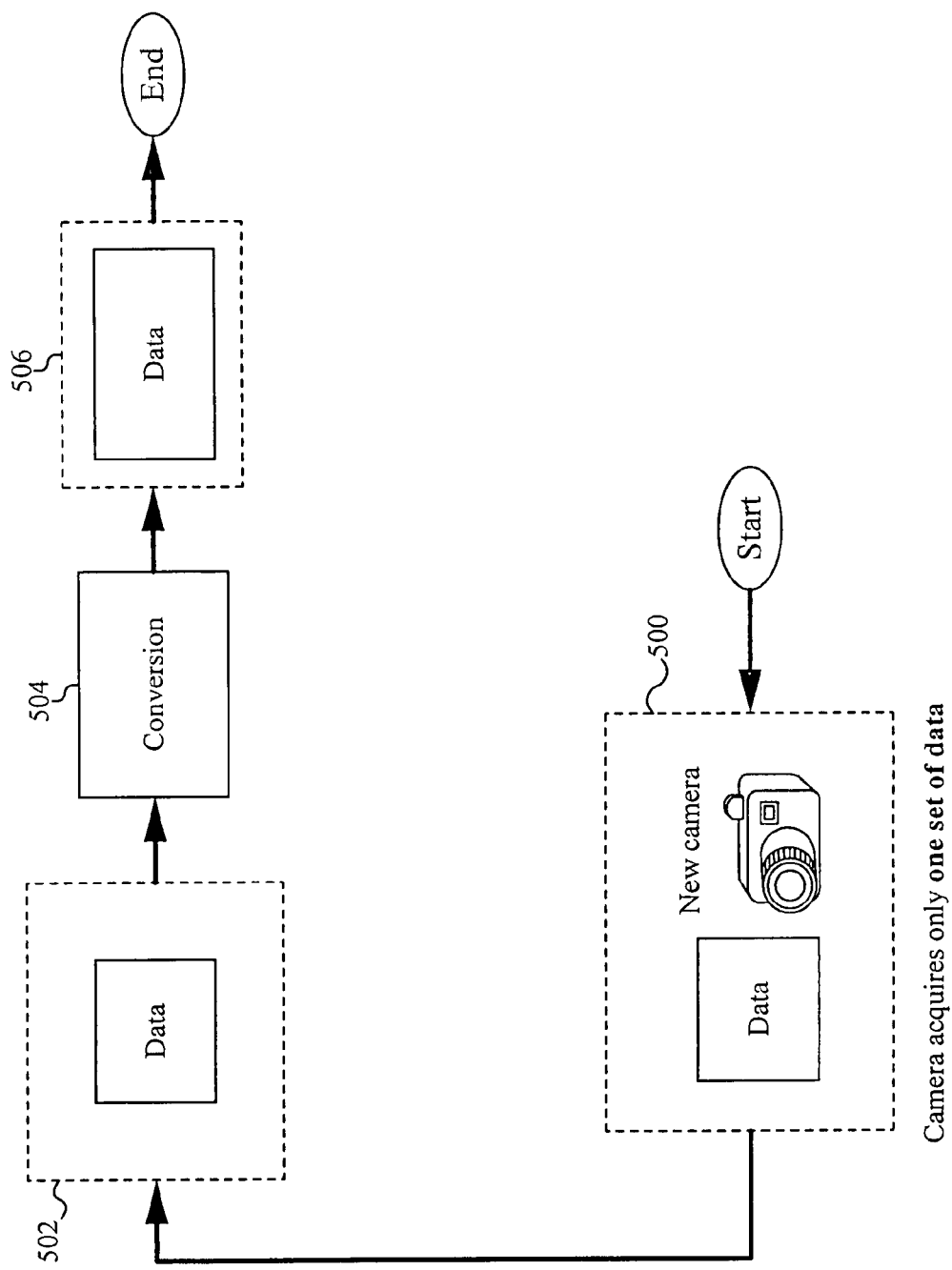
FIG. 5 illustrates a graphical flowchart of a process of acquiring and converting information.

FIG. 5 illustrates a graphical flowchart of a process of acquiring and converting information. In the step 500, a camera acquires only one set of information. Preferably the set of information is an image of more than one color. In the step 502, the set of information is transferred to a computing device. In the step 504, the set of information is converted from the RGB color space to another color space such as YCrCb. The set of information is able to be converted to other color spaces as well. The converted data 506 in the new color space is shown.

Figure 6:
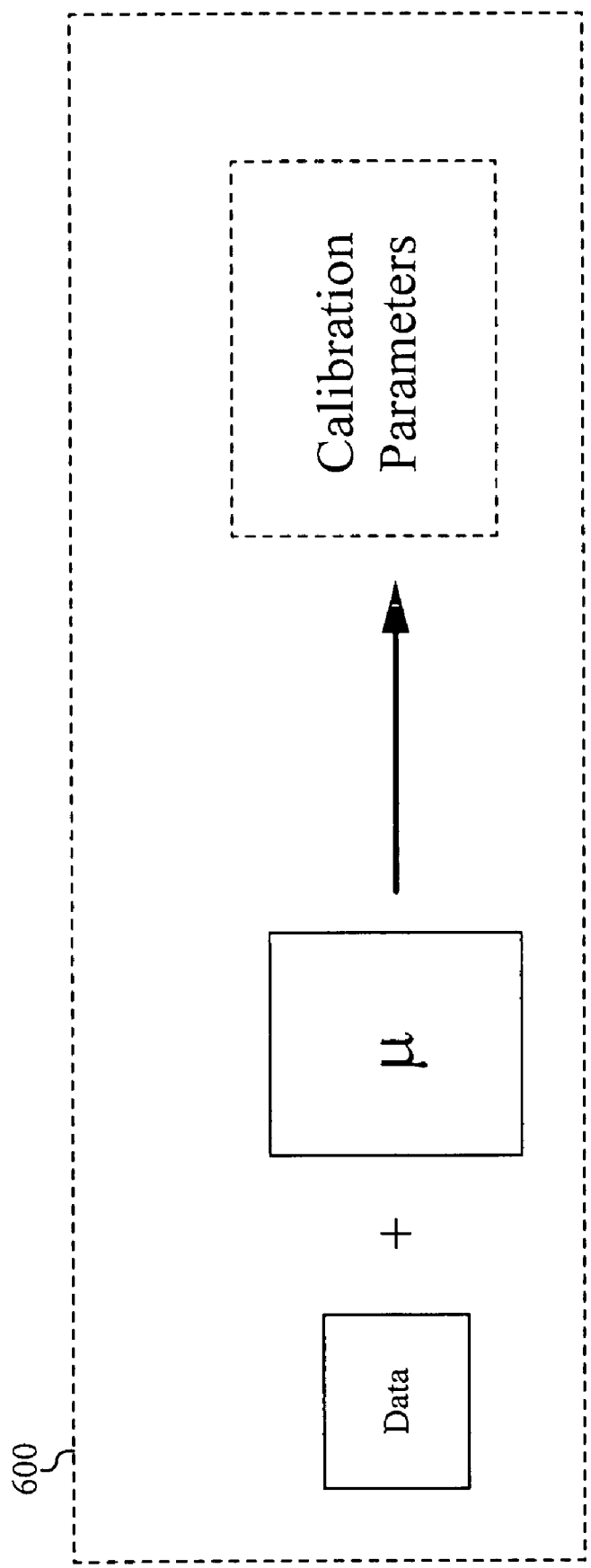
FIG. 6 illustrates a graphical flowchart of a process of predicting calibration parameters.

FIG. 6 illustrates a graphical flowchart of a process of predicting calibration parameters. In the step 600, the transformed information in the YCrCb format or other selected format which was determined in the step 502 (FIG. 5) is applied to the set of regression coefficients, $\mu$, which was determined in the step 400 (FIG. 4). This results in the prediction of the calibration parameters for the particular imaging device.

Figure 7A:
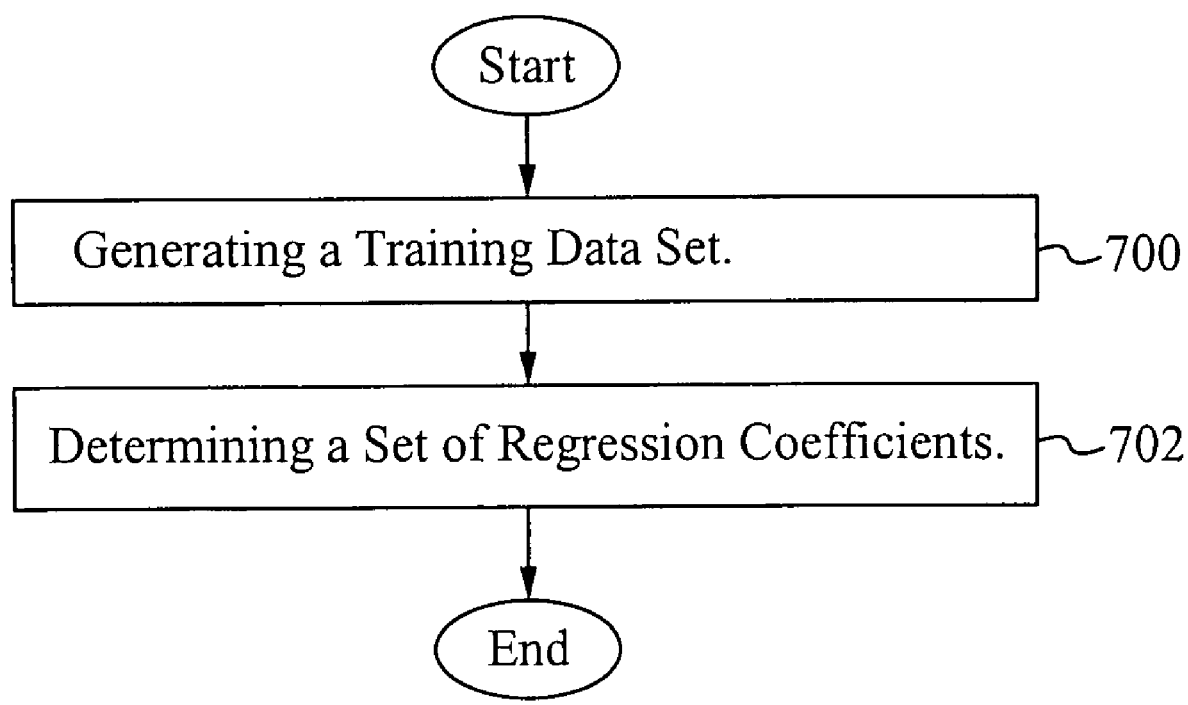
FIG. 7A illustrates a flowchart of a method of determining a set of regression coefficients.
Figure 7B:
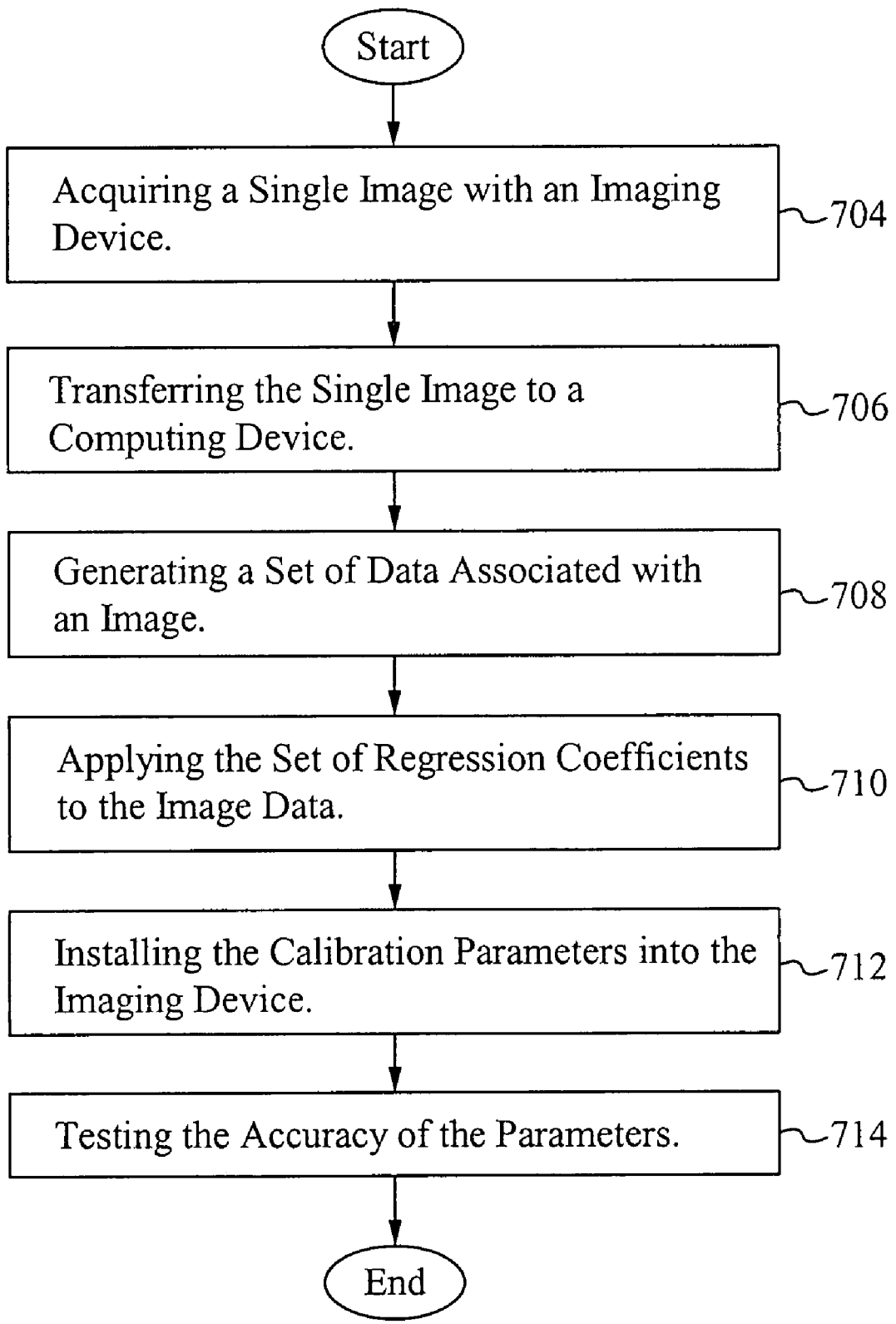
FIG. 7B illustrates a flowchart of a method of directly estimating digital imaging calibration parameters.

The processes above are combined into a method of directly estimating digital imaging calibration parameters as illustrated in FIGS. 7A and 7B. In the step 700, a training data set is generated after capturing sets of data. For statistical accuracy, preferably 50 camera measurements or more are used to model the calibration parameters. In the step 702, multiple regression, sequential regression from residues or pseudoinverse is used to compute a set of regression coefficients.

In the step 704, a camera acquires a single image of color patches. In the step 706, the single image is transferred to a computing device. In the step 708, a set of data associated with an image is generated. In the step 710, the set of regression coefficients is applied to the image data, and the result contains the calibration parameters. In the step 712, the calibration parameters are installed into the camera. Optionally, in the step 714, the accuracy of the final result is tested.

Figure 8:
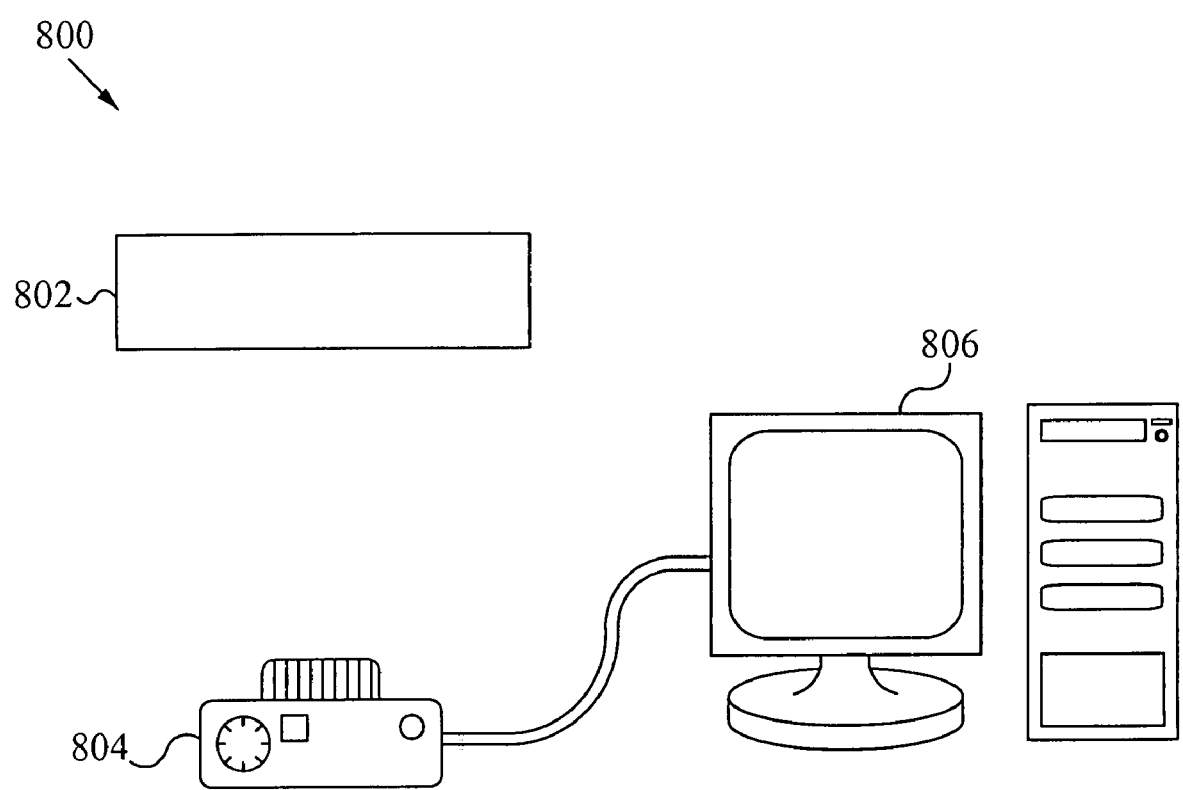
FIG. 8 illustrates a graphical representation of a calibration system.

FIG. 8 illustrates a graphical representation of a calibration system 800. The calibration system 800 includes an object 802 of varying colors. Preferably, the object 802 of varying colors is a color box with color patches. An imaging device 804 such as a digital camera or camcorder acquires an image of the color box where the image will be used to calibrate the imaging device 804. Components within the imaging device 804 such as a sensor are calibrated based on the image information acquired of the color box. After the image is acquired by the imaging device 804, the image information is transferred to a computing device 806 to determine what modifications are needed, if any, to calibrate the imaging device 804. Once the computing device 806 has the image information, the computing device 806 generates calibration parameters to calibrate the imaging device 804. The imaging device 804 is able to transfer the image information to the computing device 806 either wirelessly or wired, depending on the desired configuration.

Depending on the implementation, the calibration parameters are generated using a standard calibration algorithm or they are directly estimated as described herein. When using the standard calibration algorithm, many images of a variety of objects are acquired. Then, the images are used to determine the calibration parameters to calibrate the imaging device 804. When directly estimating the calibration parameters, a training data set is acquired first which is used for directly estimating the calibration parameters based on the methodology described above. Once the training data set is generated, subsequent imaging devices do not need to acquire more than a single image. By only acquiring one image and transferring one set of imaging information, the process of calibrating an imaging device is improved greatly. Furthermore, since many imaging devices are calibrated; as a whole, a significant amount of time is saved.

Preferably, generating the training data set occurs off of the production floor, so that processing of the imaging devices is able to occur smoothly and rapidly. Therefore, a separate station is used wherein many imaging devices acquire images, so that a computing device is able to generate the training data set. Then, the training data set is stored in computers on the production floor which are coupled to imaging devices that need to be calibrated. These imaging devices acquire only one image and use the training data set to directly estimate the calibration parameters.

Figure 9:
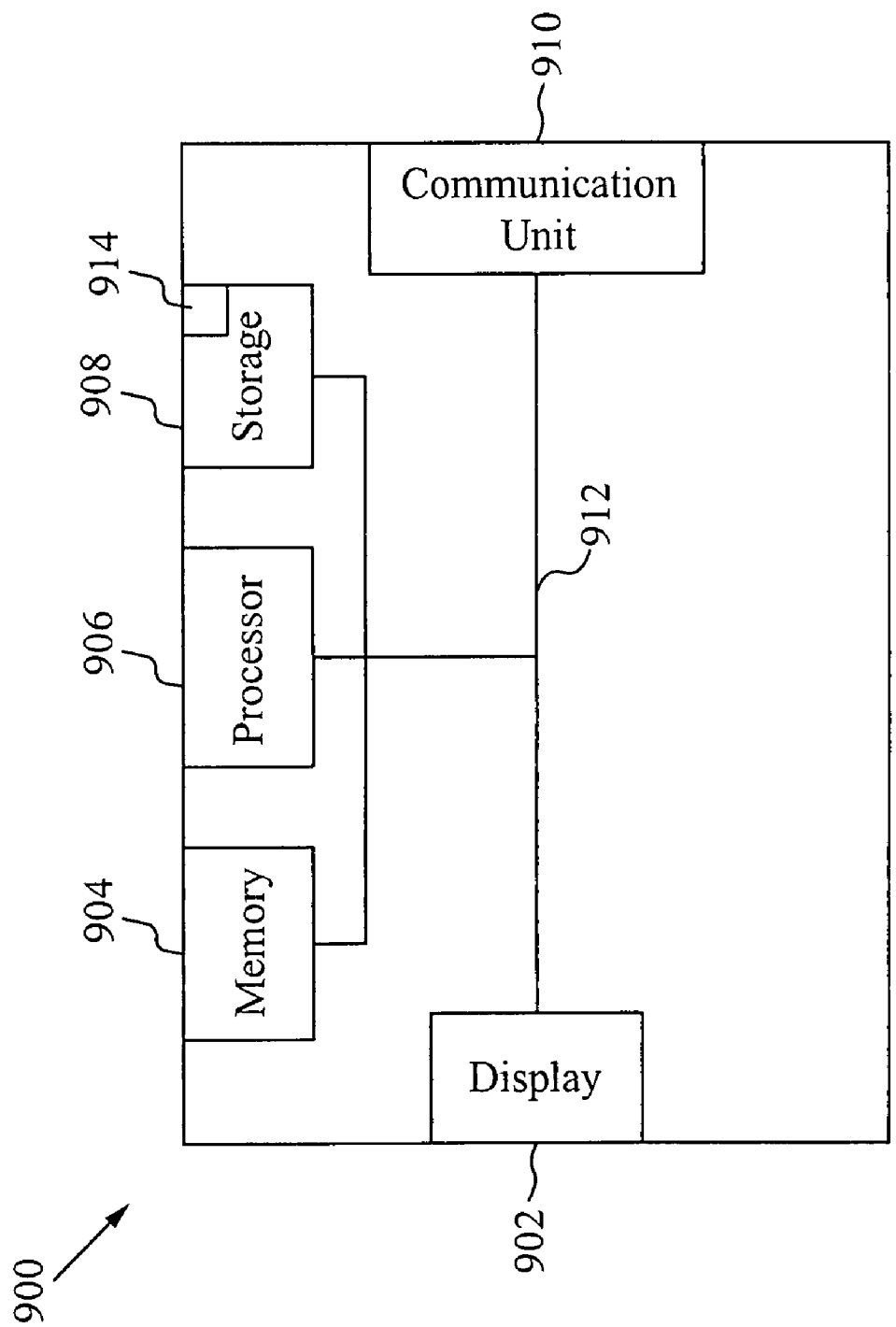
FIG. 9 illustrates a graphical representation of a computing device for calibrating an imaging device.

FIG. 9 illustrates a graphical representation of a computing device for calibrating an imaging device. A computing device 900 includes a number of elements: a display 902, a memory 904, a processor 906, a storage 908, a communication unit 910 and a bus 912 to couple the elements together. The communication unit 910 allows the imaging device to communicate with the computing device 900 such as to transfer acquired image information so the image information is processed by the processor 906 and temporarily stored on the memory 904 and more permanently on the storage 908. An application 914 stored within the storage 908 or at least with access to the processor 906 implements the method described herein to calibrate the imaging device. The display 902 displays information related to the application 914 in addition to other standard computing display information. The computing device 900 is able to be, but is not limited to, a personal computer, a server, a workstation, a PDA and a laptop.

Figure 10:
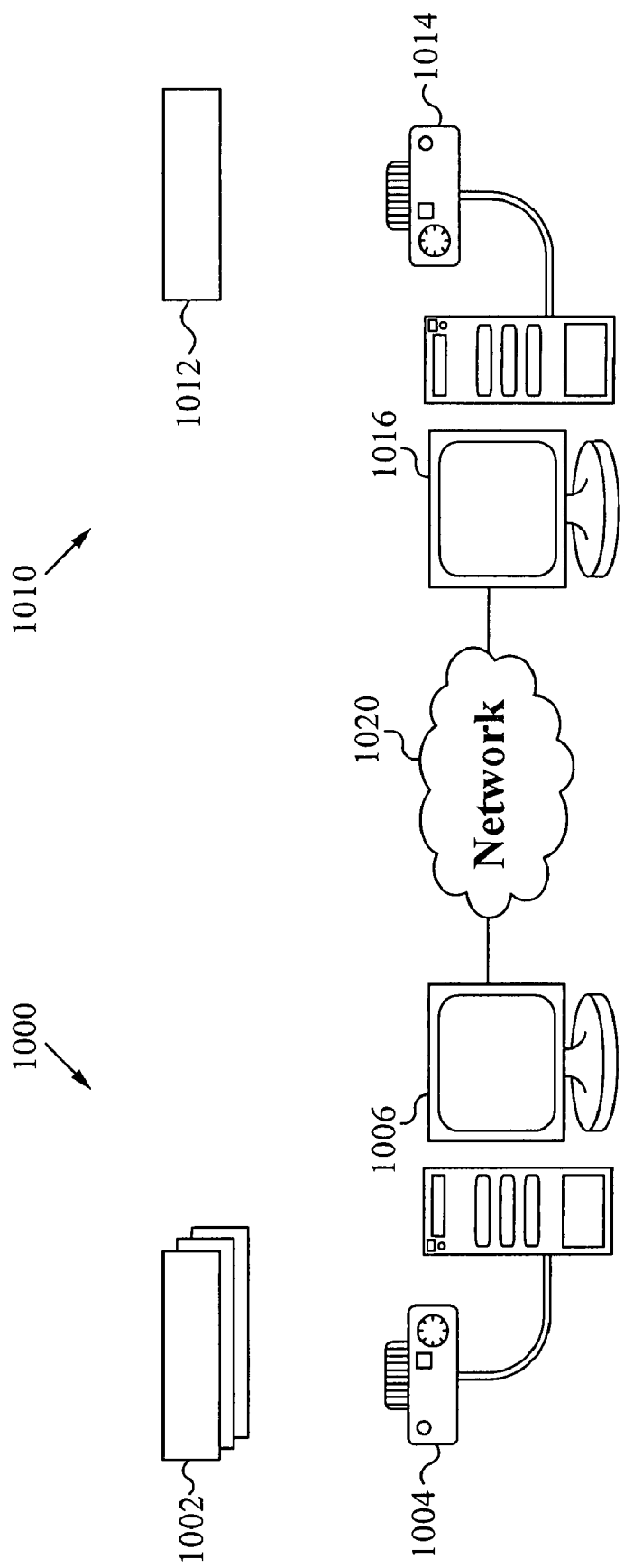
FIG. 10 illustrates a graphical representation of a network for calibrating imaging devices.

FIG. 10 illustrates a graphical representation of a network 1020 for calibrating imaging devices. The network 1020 is able to be any network, such as a local area network or a wide area network. Furthermore, the network is able to be wired, wireless or a combination of both. Coupled to the network 1020 is a training system 1000 which includes a training computing device 1006 which receives information from a set of training imaging devices 1004. The information includes images of a variety of objects 1002 such as color boxes. To acquire the information, each imaging device of the set of training imaging devices 1004 takes pictures of the variety of objects 1002. The training computing device 1006 then uses a standard calibration algorithm to generate a training data set from the information acquired by the set of training imaging devices 1004 as described above. Preferably, the training system 1000 is not located on the production floor. Also coupled to the network 1020 is a calibration system 1010 which includes a calibrating computing device 1016 and an imaging device 1014 to be calibrated. The calibrating computing device 1016 receives the training data set from the training computing device 1006 and then utilizes the training data set to calibrate the imaging device 1014 where the imaging device 1014 only acquires one image of an object 1012 with more than one color, and a direct estimation of the calibration parameters is performed as described herein.

In another embodiment, the training system 1000 and the calibration system 1010 are coupled directly without a network.

To utilize the direct estimation system and method, a training data set is generated. The training data set is generated by a computing device after one or more imaging devices acquire images of varying colored objects. Then, with other imaging devices that need to be calibrated, a single image is acquired. Each image is transferred to the computer which then uses the training data and the acquired image to directly estimate calibration parameters which are used to calibrate the imaging devices. By directly estimating the calibration parameters, the standard calibration method is not performed, thus saving time.

In operation, the direct estimation system and method is able to calibrate many more imaging devices in a shorter amount of time than previous calibration mechanisms. Aside from acquiring sets of images to generate a training data set with a first set of imaging devices, the other imaging devices only need to acquire one image. Thus, the time spent acquiring images is essentially halved because only one image is acquired for the bulk of the imaging devices. Also, the amount of data acquired is also essentially halved because only one image is acquired for the bulk of the imaging devices. With half as much data having to be transferred from the imaging devices to the computer, the amount of time spent on the transfer is also essentially halved. The computer has additional computations to make to directly estimate the calibration parameters, but that amount of time is minimal compared to the time savings of approximately acquiring half as many images and transferring half as much data.

Additional devices are able to be calibrated using the method described herein such as television screens, computer monitors, other displays and printers.

In some embodiments, a computing device which is used to calibrate an imaging device is included within the imaging device. For example, the imaging device contains at least one processor which in addition to performing image acquisition and manipulation operations, also performs image calibration computations as described above. The imaging device stores a calibration application which utilizes the processor to calibrate the imaging device. The imaging device receives the calibration application in any manner, such as via a wired connection or wirelessly. Data that the computing device would receive as described above is also able to be received within the imaging device in any manner.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A computing device for calibrating an imaging device comprising:
  a. a processor; and
  b. an application for utilizing the processor to calculate a set of calibration parameters from a single image and a training data set generated from images acquired by a plurality of imaging devices, wherein the set of calibration parameters are used to calibrate the imaging device.

2. The device as claimed in claim 1 further comprising a communication unit for communicating with the imaging device.

3. The device as claimed in claim 1 wherein the imaging device is selected from the group consisting of a digital camera and a digital camcorder.

4. The device as claimed in claim 1 wherein the computing device is selected from the group consisting of a personal computer, a server, a workstation, a PDA and a laptop.

5. The device as claimed in claim 1 wherein the image is of more than one color.

6. The system as claimed in claim 1 wherein the computing device calibrates the imaging device.

7. The device as claimed in claim 1 wherein the computing device calibrates a sensor within the imaging device.

8. The device as claimed in claim 1 wherein regression coefficients are determined from the training data set.

9. The device as claimed in claim 8 wherein the set of calibration parameters are determined from the regression coefficients and information from the image.

10. The device as claimed in claim 8 wherein the regression coefficients are computed using a method selected from the group consisting of multiple regression, sequential regression from residues and pseudoinverse.

11. The device as claimed in claim 1 wherein the processor and the application are contained within the imaging device.

12. A calibration system comprising:
  a. an imaging device for acquiring a single image; and
  b. a computing device coupled to the imaging device for storing a training data set generated from images acquired by a plurality of imaging devices and for calculating a set of calibration parameters from the image and the training data set wherein the set of calibration parameters are used to calibrate the imaging device.

13. The system as claimed in claim 12 wherein the imaging device is selected from the group consisting of a digital camera and a digital camcorder.

14. The system as claimed in claim 12 wherein the computing device is selected from the group consisting of a personal computer, a server, a workstation, a PDA and a laptop.

15. The system as claimed in claim 12 wherein the image is of more than one color.

16. The system as claimed in claim 12 wherein the computing device calibrates the imaging device.

17. The system as claimed in claim 12 wherein the computing device calibrates a sensor within the imaging device.

18. The system as claimed in claim 12 wherein regression coefficients are determined from the training data set.

19. The system as claimed in claim 18 wherein the set of calibration parameters are determined from the regression coefficients and information from the image.

20. The system as claimed in claim 18 wherein the regression coefficients are computed using a method selected from the group consisting of multiple regression, sequential regression from residues and pseudoinverse.

21. A method of calibrating an imaging device comprising:
   a. acquiring a single image of more than one color with the imaging device;
   b. transferring the image to a computing device;
   c. calculating a set of calibration parameters from the image and a training data set generated from images acquired by a plurality of imaging devices; and
   d. calibrating the imaging device using the set of calibration parameters.

22. The method as claimed in claim 21 wherein the imaging device is selected from the group consisting of a digital camera and a digital camcorder.

23. The method as claimed in claim 21 wherein the computing device is selected from the group consisting of a personal computer, a server, a workstation, a PDA and a laptop.

24. The method as claimed in claim 21 wherein calibrating the imaging device includes calibrating a sensor within the imaging device.

25. The method as claimed in claim 21 further comprising generating the training data set.

26. The method as claimed in claim 21 wherein the training data set is generated from a first set of previously acquired images.

27. The method as claimed in claim 21 wherein regression coefficients are determined from the training data set.

28. The method as claimed in claim 27 wherein the set of calibration parameters are determined from the regression coefficients and information from the image.

29. The method as claimed in claim 27 wherein the regression coefficients are computed using a method selected from the group consisting of multiple regression, sequential regression from residues and pseudoinverse.

30. The method as claimed in claim 21 wherein the computing device is contained within the imaging device.

* * * * *